June 28, 1966 H. ESPENSCHIED ETAL 3,257,951
APPARATUS FOR CLEANING WINDSHIELDS
Filed Aug. 4, 1964 2 Sheets-Sheet 1

INVENTORS
Helmut Espenschied
Erich Kolb by Michael J. Striker

United States Patent Office 3,257,951
Patented June 28, 1966

3,257,951
APPARATUS FOR CLEANING WINDSHIELDS
Helmut Espenschied, Buhlertal, and Erich Kolb, Eisental uber Buhl, Germany, assignors to Robert Bosch G.m.b.H., Stuttgart, Germany
Filed Aug. 4, 1964, Ser. No. 387,283
Claims priority, application Germany, Aug. 31, 1963, B 73,337
7 Claims. (Cl. 103—23)

The present invention relates to pumps in general, and more particularly to an apparatus which is especially suited for cleaning windshields on automotive vehicles and the like. Still more particularly, the invention relates to an improved washer pump which may be combined with the wiper motor in an automotive vehicle to direct jets of water or another liquid solvent against the outer side of the windshield and into the path of one or more windshield wipers so that the windshield may be cleaned in a fully automatic way while the vehicle is in motion.

In many presently known windshield cleaning or washing apparatus, the pump which sprays a liquid solvent onto the windshield is driven by a motion transmitting member which is operated by the wiper motor. The motion transmitting member is connected to the piston of the washer pump in such a way that the speed at which the piston performs a working (liquid expelling) stroke cannot exceed the speed of the motion transmitting member. Thus, the energy which is stored in the pump mechanism at the time the piston was caused to perform a suction stroke cannot be released at any desired rate of speed so that the discharge of liquid solvent often "lags" behind or is otherwise improperly related to the movement of the windshield wipers. Consequently, the solvent will not reach the windshield at the time the windshield wiper or wipers are in an optimum position for distributing such solvent on the exposed side of the windshield. Such non-synchronized discharge of liquid solvent is observable when the windshield wipers are driven at a high speed.

Accordingly, it is an important object of the present invention to provide an improved windshield cleaning apparatus which is constructed and assembled in such a way that the speed at which the apparatus discharges one or more jets of liquid solvent against the outer side of the windshield is entirely independent of the speed of that mechanism which causes the washer pump to perform suction strokes.

Another object of the invention is to provide an improved washer pump which may be utilized in an apparatus of the just outlined characteristics and to construct the pump in such a way that the speed of working strokes is independent of the speed of the mechanism which causes the pump to draw liquid solvent from a reservoir or from another source of such liquid.

A further object of the invention is to provide an improved driving connection between the wiper motor and the washer pump in a windshield wiping and cleaning apparatus for automotive vehicles or other types of conveyances.

An additional object of the invention is to provide a novel timer mechanism which enables the pump to discharge a desired number of strong liquid streams and to automatically terminate the discharge of liquid when the windshield is properly cleaned so as to economize with liquid solvent without, however, affecting the cleaning action.

A concomitant object of the instant invention is to provide a novel operative connection between the timer mechanism and the piston rod of a washer pump which is used for periodic cleaning of windshields in automotive vehicles.

A further object of the invention is to provide a washer pump for use in automotive vehicles which is constructed and assembled in such a way that the driver may initiate the discharge of liquid solvent regardless of whether the engine is running and regardless of whether the windshield wipers are idle or in motion.

An additional object of the invention is to provide a novel starter device which may initiate the operation of the washer pump simultaneously with or independently of the wiper motor, which consumes little energy for its operation, and which enables the driver or another operator to initiate ejection of liquid solvent at his discretion and by exertion of a minimal force.

Still another object of the invention is to provide a washer pump of the above outlined characteristics which is of very simple, rugged and compact design, which may be readily combined with many types of presently utilized wiper motors, which occupies little room, and which may be rapidly converted to discharge different quantities of liquid solvent.

With the above objects in view, one feature of the present invention resides in the provision of a pump, particularly a washer pump which is used to spray water or another liquid solvent onto the windshield of an automotive vehicle. The pump comprises a cylinder which defines a working chamber, a piston provided in the chamber and movable with reference to the cylinder to perform alternating working and suction strokes, a strong helical spring or another suitable energy storing device which is arranged to store energy when the piston moves in a first direction to perform a suction stroke and to thereupon release energy to effect movement of the piston in the opposite direction so that the piston performs a working stroke, drive means normally engaging with and being operative to move the piston in the first direction so that the spring stores energy while the piston performs a suction stroke, and means for automatically disengaging the drive means from the piston on completion of each suction stroke so that the speed at which the piston moves in the opposite direction is independent of the drive means and is determined solely by the rate at which the spring releases energy which was stored during the suction stroke.

Of course, it is equally possible to make the piston stationary and to move the cylinder with reference to the piston so that the cylinder will perform alternating working and suction strokes.

In accordance with a preferred embodiment of the invention, the pump is also provided with means for automatically disengaging the piston from the drive means upon completion of a predetermined number of working and suction strokes.

The novel features which are considered as characteristic of the invention are set forth in particular in the appended claims. The improved pump itself, however, both as to its construction and its mode of operation, together with additional features and advantages thereof, will be best understood upon perusal of the following detailed description of a specific embodiment with reference to the accompanying drawings, in which:

Figure 1:
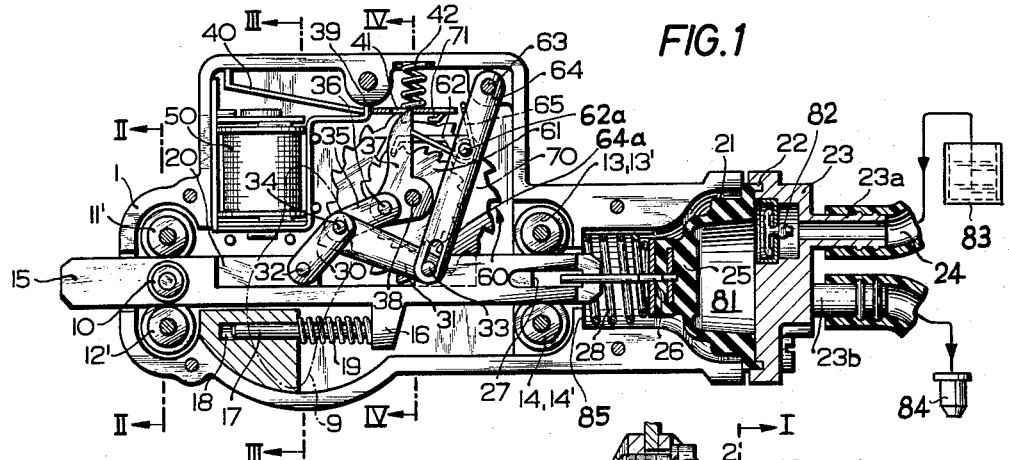
FIG. 1 is a longitudinal section through a washer pump which embodies one form of our invention and which is combined with the motor of a windshield wiper for automotive vehicles, the section of FIG. 1 being taken in the direction of arrows as seen from the line I—I of FIG. 2 or 3.
Figure 3:
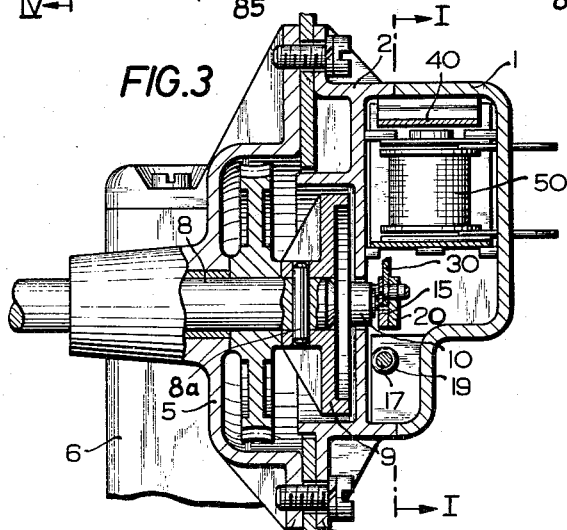
FIG. 3 is a similar transverse section as seen in the direction of arrows from the line III—III of FIG. 1.
Figure 2:
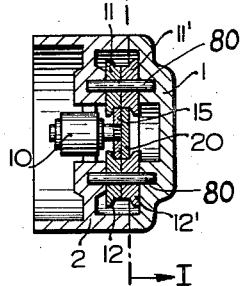
FIG. 2 is a transverse section through one end portion of the pump substantially as seen in the direction of arrows from the line II—II of FIG. 1.

Referring to the drawings, and first to FIGS. 1 to 4, there is shown a washer pump having a fixed housing which includes two sections or shells 1 and 2. These sections are connected to each other by screws or by bolts and nuts to define an internal space which accommodates the component parts of the washer pump and certain components of the drive means. The section 2 is provided with an outwardly extending flange 3 which is adjacent to a similar flange 4 on the gear box 5 of a wiper motor 6. The flanges 3, 4 are secured to the opposite sides of a supporting bracket 7 which is mounted on the chassis of an automotive vehicle. Thus, the wiper motor may be immediately adjacent to the pump housing. The gear box 5 comprises a bearing for the output shaft 8 of the wiper motor 6, and the right-hand end portion of this output shaft (as viewed in FIG. 3) extends through a suitable opening in the bracket 7 and is drivingly connected with a cam 9 which serves as a means for initiating the suction strokes of the washer pump. The connection between the output shaft 8 and the cam 9 comprises a diametral pin 8a. The other end portion of the output shaft 8 drives a crank arm which is coupled to and drives one or more windshield wipers in a manner well known in the art and not illustrated in the drawings.

Figures 4, 5, 6:
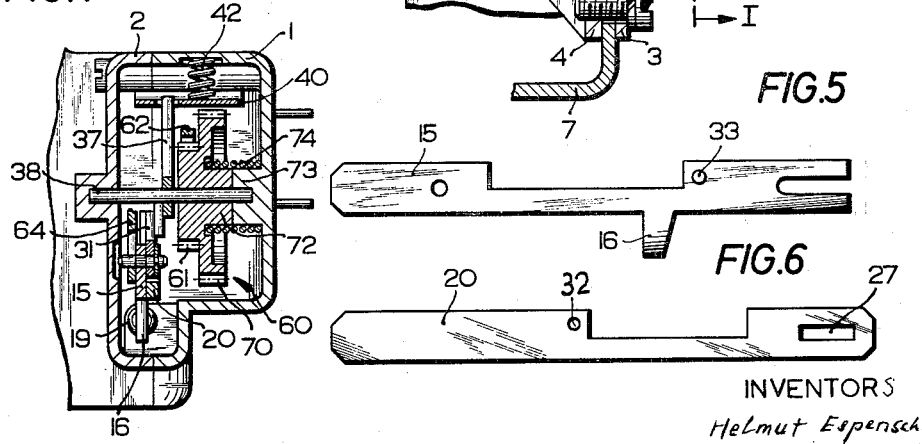
FIG. 4 is a further transverse section as seen in the direction of arrows from the line IV—IV of FIG. 1.
FIG. 5 is a side elevational view of a motion transmitting member which is utilized in the pump of FIGS. 1 to 4.
FIG. 6 is a side elevational view of an actuating member.

The periphery of the cam 9 is tracked by a roller follower 10 which is mounted to rotate at one end of an elongated reciprocatory motion transmitting member in the form of a push bar 15, best shown in FIGS. 1 and 5. This push bar is reciprocable between pairwise arranged guide rolls 11, 12 and 13, 14 which are mounted in the housing of the washer pump, and the direction in which the push bar 15 reciprocates is preferably perpendicular to the axis of the output shaft 8. When the push bar 15 moves in a direction to the left, as viewed in FIG. 1, the washer pump may be caused to perform a suction stroke, and such movement of the push bar is limited by a stop pin 17 which is received in a blind bore 18 of the housing section 1. The free end of the pin 17 is located in the path of a projection 16 on the push bar 15, and the pin 17 is surrounded by a helical expansion spring 19 which biases the push bar in the opposite direction, namely, in a direction to the right as viewed in FIG. 1.

The push bar 15 is disposed side-by-side with a flat strip-shaped actuating member in the form of a piston rod 20 which is guided by rolls 11', 12' and 13', 14'. The rolls 11'–14' are coaxial with the corresponding rolls 11–14 and are mounted on pivots 80 which are journalled in the housing sections 1 and 2, see particularly FIG. 2 of the drawings. The right-hand end portion of the piston rod 20 is coupled to a diaphragm-type piston 21 which consists of elastically deformable material and comprises an annular marginal portion or bead 22 which is clamped between the end faces of the housing sections 1, 2 and the adjacent face of a pump cover 23. The piston 21 resembles a cup and is accommodated in a working chamber 81 which receives and discharges cleaning liquid in response to operation of the mechanism which causes the base 25 of the piston to perform alternating working and suction strokes. The right-hand portions of the housing sections 1, 2, as viewed in FIG. 1, define with the cover 23 a cylinder which receives the piston 21.

Figure 7:
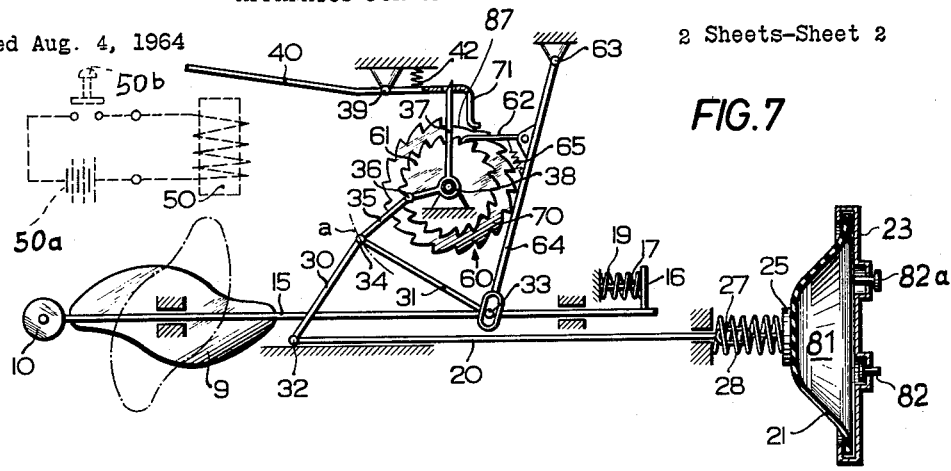
FIG. 7 is a diagrammatic view of the structure shown in FIG. 1 and illustrates the pump in idle position.
Figure 8:
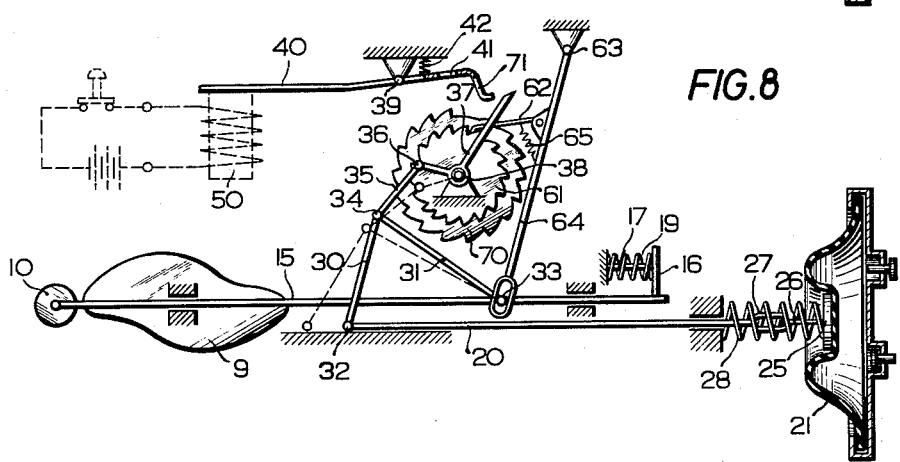
FIG. 8 is a similar diagrammatic view and illustrates the pump following the discharge of a liquid solvent from the working chamber.
Figure 9:
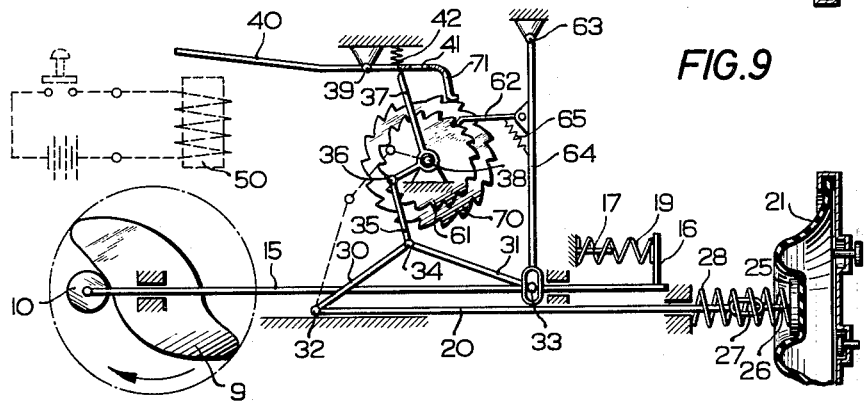
FIG. 9 is another diagrammatic view and illustrates the pump in a position during automatic ejection of liquid solvent when the pump is driven by the wiper motor.

The cover 23 accommodates an inlet check valve 82 and an outlet check valve 82a (see FIGS. 7–9). FIG. 1 shows that the cover 23 is provided with an intake nipple 23a and a discharge nipple 23b, and these nipples are respectively connected with flexible conduits 24, 24a. The conduit 24 is a suction conduit and its inlet end dips into a supply of cleaning liquid contained in a suitable source here shown as a reservoir 83. The conduit 24a is a supply conduit and serves to deliver streams of cleaning liquid to a suitable nozzle 84 which directs the liquid against the outer side of a windshield and into the path of the wipers, not shown. The parts 5, 6, 8, 9, 10 and 15 constitute a drive which serves to move the piston 21, through the intermediary of the piston rod 20, in a first direction so that the piston 21 then performs suction strokes.

The base 25 of the piston 21 is connected to one end of a hook-shaped coupling member 26 whose bent-over portion extends into an elongated slot 27 provided in the right-hand end of the piston rod 20, see particularly FIG. 6. The base 25 is biased by an energy storing device in the form of a strong helical spring 28 which constitutes the means for effecting the working or discharge strokes of the piston 21. This spring 28 is inserted between the outer end face of the base 25 and an internal annular shoulder 85 defined by the housing sections 1 and 2. The bias of the spring 28 is much stronger than the bias of the spring 19, and the spring 28 will store energy whenever the piston 21 performs a suction stroke.

The means for connecting the push bar 15 with the piston rod 20 comprises a link train including a deformable toggle joint comprising a first link 30 which is articulately connected with the piston rod 20 by a pivot pin 32 and a second link 31 which is articulately connected with the push bar 15 by a pivot pin 33. A third pivot pin 34 connects the free ends of the links 30, 31 to each other so that the angle enclosed by the links 30, 31 increases or decreases, depending upon whether one of the pins 32, 33 moves in a direction away from or toward the other pin, i.e., whether the pin 34 moves toward or away from the straight line which connects the axes of the pivot pins 32, 33. In other words, the pivot pin 34 is movable in a direction normal to the direction of reciprocation of the push bar 15 and piston rod 20 when the toggle joint undergoes deformation. The arrangement is such that the distance between the pivot pin 34 and the push bar 15 increases when the push bar is held against movement and when the piston rod 20 moves in a direction to the right, namely, when the washer pump performs a working stroke to deliver a stream of liquid solvent to the nozzle 84.

The pivot pin 34 is connected with one end of a third link 35 which forms part of a locking device, and the other end of this third link 35 is connected to a pivot pin 36 which is carried by the shorter arm of a bell crank lever 37. The lever 37 is rockable on a pivot pin 38 which is anchored in the housing sections 1 and 2, see FIG. 4. The longer arm of the bell crank lever 37 cooperates with the right-hand leg of a releasable locking member which resembles a scale beam and is fulcrumed at 39. In the locking position of FIG. 1, the locking member 40 prevents clockwise rotation of the bell crank lever 37 because the tip of the longer arm of the lever 37 extends into a rectangular cutout 41 provided in the right-hand leg (locking portion) of the locking member. This right-hand leg or locking portion is biased by a resilient element here shown as a helical spring 42 which tends to rock the locking member 40 in a clockwise direction, as viewed in FIG. 1, so as to make sure that the cutout 41 may receive a portion of the lever 37.

The starter means for disengaging the bell crank lever 37 from the locking member 40 at the will of the operator comprises an electromagnet 50, and the timer device which determines the number of consecutive working strokes includes a ratchet mechanism comprising a ratchet wheel assembly 60. The arrangement is such that the bell crank lever 37 may be disengaged by the electromagnet 50 or by the ratchet mechanism. The left-hand leg of the locking member 40 constitutes the movable armature of the electromagnet 50 and, when the latter is energized, the member 40 is caused to rock in a counterclockwise direction, as viewed in FIG. 1, so as to move the cutout 41 upwardly and against the bias of the spring 42.

The ratchet mechanism comprises the ratchet wheel assembly 60 which includes two concentric interconnected toothed disks 61, 70. The disk 61 is smaller than the disk 70 and both disks are rotatable on the fixed pivot pin 38 for the bell crank lever 37. The disk 61 cooperates with a pawl 62 which is pivotably supported by a one-armed releasing lever 64, the latter being rockable with one of its ends about a pivot pin 63 which is fixed to the pump housing. The other end of the releasing lever 64 is provided with an elongated slot 64a which receives the pivot pin 33. A torsion spring 65 which is convoluted around the pivot pin 62a for the pawl 62 biases this pawl into engagement with the teeth on the disk 61. When the push bar 15 performs a forward stroke and a return stroke, the releasing lever 64 is caused to rock about the pin 63 and causes the pawl 62 to turn the disk 61 by a step in a counterclockwise direction, as viewed in FIG. 1. When the push bar 15 moves to the right, the tip of the pawl 62 merely rides over a tooth of the disk 61 against the bias of the spring 65, but the pawl 62 will rotate the disk 61 when the push bar 15 moves to the left, i.e., when the releasing lever 64 is rocked in a clockwise direction.

The larger disk 70 comprises an annulus of teeth whose angular spacing circumferentially of the disk 70 is the same as the spacing of teeth on the disk 61. However, the number of teeth on the disk 61 exceeds by one the number of teeth on the disk 70; in other words, the gap 87 (see FIG. 7) between two selected adjoining teeth of the disk 70 is twice as wide as the gaps between the remaining teeth of the disk 70. The disk 70 cooperates with a tongue or pallet 71 of the locking member 40, and its purpose is to disengage the member 40 from the bell crank lever 37 in response to each angular displacement of the disk 61 with a single exception, namely, when the pallet 71 extends into the gap 87. FIG. 1 shows that the teeth of the disk 70 are configurated with a view to insure gradual rocking of the locking member 40 so that the latter releases the bell crank lever 37 shortly before the ratchet wheel assembly 60 completes a step in response to rocking of the releasing lever 64 in a clockwise direction. As soon as the pallet 71 has moved over the tip of a tooth on the larger disk 70, the spring 42 expands again and moves the pallet into the gap between the next pair of adjoining teeth. As stated above, one tooth on the disk 70 is "missing" so that, during the interval of time necessary to complete a full revolution, the disk 70 will fail only once to unlock the lever 37.

The disk 70 comprises a hub 72 (shown in FIG. 4) which is coaxial with a cylindrical boss 73 on the housing section 1. The diameters of the hub 72 and boss 73 are the same, and their peripheries are in frictional engagement with a coil 74 which serves to prevent rotation of the ratchet wheel assembly 60 in a counterclockwise direction, as viewed in FIG. 1.

The electrical circuit of the electromagnet 50 includes a source 50a of electrical energy (which may be the battery of the automotive vehicle in which the washing pump is used) and a switch 50b which is normally open. This switch may be manipulated by hand or automatically in response to starting of the wiper motor 6.

The operation of the improved washer pump will be described with reference to FIGS. 1, 7, 8 and 9. FIGS. 1 and 7 illustrate the pump in idle position in which the piston 21 has completed its suction stroke and the working chamber 81 contains a supply of liquid solvent. One lobe of the cam 9 has moved the follower 10 to the left-hand end position and the tip of the upper arm on the bell crank lever 37 extends into the cutout 41. The spring 28 is compressed between the base 25 of the piston 21 and the shoulder 85 whereby this spring stores energy and tends to move the piston rod 20 in a direction to the right, together with the pivot pin 32 which is connected to the piston rod. Were the spring 28 permitted to expand, it would deform the toggle joint 30, 31 by causing the link 30 to rotate in a clockwise direction and to move the pivot pin 34 away from the push bar 15. Since the link 30 is coupled to the link 35 which in turn is coupled to the shorter arm of the momentarily locked bell crank lever 37, the pivot pin 34 would have to travel in an arcuate path a whose center of curvature is located on the axis of the pivot pin 36. Of course, the pivot pin 34 cannot move in the path a because it is connected with the link 31 which in turn is coupled to the push bar 15 by the pin 33. The projection 16 of the push bar 15 abuts against the stop pin 17 and is thus prevented from moving in a direction to the left so that the pin 33 cannot change its position in order to allow for movement of the pin 34 in the path a. Consequently, the piston 21 remains in the end position of FIGS. 1 and 7 as long as the bell crank lever 37 remains locked by the member 40, i.e., as long as the toggle joint 30, 31 is held against deformation by the locking member.

The pin 34 tends to move away from the push bar 15 because it is biased by the springs 28 whereby the much weaker spring 19 automatically remains in the compressed condition of FIG. 1 or 7 in which the projection 16 abuts against the stop pin 17. The distance between the projection 16 and the follower 10 is selected in such a way that the latter remains slightly spaced from the periphery of the cam 9 when the projection 16 is in actual abutment with the stop pin 17. Consequently, the wiper motor 6 may run independently of the washer pump because the follower 10 will remain out of contact with the lobes of the cam 9 even if the output shaft 8 rotates. In other words, the windshield wipers may be moved back and forth while the washer pump remains idle.

FIG. 7 shows that, when the pump is idle and the piston 21 has completed its suction stroke, the angle between the link 35 and the shorter arm of the bell crank lever 37 is an obtuse angle which is preferably only slightly less than 180 degrees. Therefore, the torque transmitted by the link train to the bell crank lever 37 (such torque tends to rotate the lever 37 in a clockwise direction, as viewed in FIG. 7) is comparatively small and a weak electromagnet will sufficient to disengage the longer arm of the lever 37 from the locking portion of the member 40.

If the driver wishes to start the washer pump, he closes for a short time the switch 50b to complete the circuit of the electromagnet 50. The latter then attracts the left-hand leg of the locking member 40 so that this locking member turns about the fulcrum 39 and moves its cutout 41 away from the tip of the bell crank lever 37. The spring 28 expands immediately to release the energy which was stored therein whereby the piston 21 performs a working stroke and expels a stream of liquid solvent through the valve 82a and nozzle 84. At the same time, the toggle joint 30, 31 undergoes deformation because the pivot pin 34 moves away from the push bar 15 without being compelled to move in a direction to the left, as viewed in FIG. 7. The pivot pin 32 moves in a direction to the right and the inclination of the link 30 with reference to the piston rod 20 increases. Such change in the position of the pivot pin 32 can take place while the push bar 15 remains in the position of FIG. 7. The bias of the spring 28 is preferably selected in such a way that this spring causes the piston 21 to discharge a strong jet of liquid solvent so that the nozzle 84 produces one or more directed liquid streams which flow at full strength as soon as the spring 28 begins to expand. In other words, the ejection of liquid takes place rather suddenly because, once the lever 37 is disengaged from the locking member 40, the spring 28 can expand without being compelled to overcome any braking action other than that furnished by the valve 82a, by the nozzle 84, by the friction on various pivot pins of the link train and by the friction between the rolls 11'–14' and piston rod 20.

The heretofore described operation of the washer pump takes place independently of the position of the cam 9. Thus, the pump may discharge a stream of liquid solvent at the time the wiper motor 6 is idle and while the cam 9 is held in the position of FIG. 8. This FIG. 8 illustrates the parts of the pump in positions they assume following the energization of the electromagnet 50 and following the discharge of a liquid stream. The push bar 15 is shown in the same position as in FIG. 7 but it is to be noted that the disengagement of the bell crank lever 37 from the locking member 40 enables the spring 19 to expand and to move the follower 10 against the periphery of the cam 9. In other words, when the lever 37 is released, the spring 19 compels the pivot pin 33 to move slightly in a direction to the right and to entrain the pivot pin 34 in the same direction. If the circuit of the electromagnet 50 is completed while the motor 6 is in operation and drives the cam 9, the latter allows the follower 10 to reach the position of FIG. 9 not later than after one-half of a full revolution of the output shaft 8. This position of the follower 10 corresponds to the right-hand end position of the push bar 15 in which the bar 15 maintains the tip at the upper end of the bell crank lever 37 in a position to the left of the cutout 41. The means for rocking the lever 37 to such end position includes the pivot pins 33, 34, 36 and the links 31, 35. While moving from the position of FIG. 8 to that of FIG. 9, the tip of the lever 37 lifts the right-hand leg of the locking member 40 for a short interval of time provided that the operator has released the switch 50b before the piston 21 has completed its working stroke. While the push bar 15 moves from the position of FIG. 8 to that of FIG. 9, it rocks the releasing lever 64 in a counter-clockwise direction whereby the tip of the pawl 62 rides over one of the teeth on the smaller disk 61.

If the cam 9 continues to rotate while the parts of the pump are in the positions shown in FIG. 9, the follower 10 is moved in a direction to the left whereby the push bar 15 entrains the pivot pin 33 in the same direction and the bell crank lever 37 automatically returns to the locked position of FIG. 7. Such return movement of the lever 37 takes place in the first stage of a return stroke of the push bar 15. This first stage of return movement is comparatively short and the pivot pin 33 moves nearer to the pin 32 so that the magnitude of the angle between the links 30, 31 decreases. The piston rod 20 remains temporarily in the end position of FIG. 9 while the pin 34 moves upwardly and away from the push bar 15. Simultaneously with such upward movement, the pin 34 also performs a movement to the left, as viewed in FIG. 9 in order to return the lever 37 in engagement with the locking member 50. Once the lever 37 is locked, the pin 34 remains in the arcuate path a and, as the cam 9 continues to shift the follower 10 in a direction to the left, the pin 34 travels in the path a which means that the pivot pin 32 must travel to the left and entrains the piston rod 20. The piston rod 20 entrains the piston 21 through the intermediary of the hook 26 so that the spring 28 is compressed and stores energy while the piston 21 draws a new supply of liquid solvent from the reservoir 83, through the suction conduit 24, through the inlet check valve 82 and into the working chamber 81.

While moving in a direction to the left, the push bar 15 entrains the lower end portion of the lever 64 which is caused to rock in a clockwise direction whereby the pawl 62 rotates the disk 61 in a counter-clockwise direction and through the angle corresponding to the distance between the radial faces of two adjoining teeth on this disk. The disk 61 entrains the larger disk 70 whereby a tooth on the disk 70 engages the pallet 71 shortly and preferably immediately before the push bar 15 completes its leftward stroke. The pallet 71 yields by moving upwardly, as viewed in FIG. 9, and discharges the locking member 40 from the bell crank lever 37 whereby the spring 28 is free to release its energy and the piston 21 performs the next working stroke to discharge a fresh stream of liquid solvent through the nozzle 84.

When the push bar 15 reaches the left-hand end turn, the pawl 62 has rotated the disk 70 through an angle which is necessary to place another gap between the adjoining teeth of the disk 70 into the path of the pallet 71 whereby the spring 42 is free to rock the member 40 to locking position in which the lever 37 may enter the cutout 41. The same operation is repeated during each half revolution of the cam 9 until the pallet 71 enters the wide gap 87 between the teeth of the disk 70, see FIG. 7. In such position of the ratchet wheel assembly 60, the follower 10 remains spaced from cam 9 and the latter may rotate without causing any discharge of liquid solvent. Thus, in order to start the pump, the driver must again complete the circuit of the electromagnet 50 by closing the switch 50b in order to rock the member 40 in a counterclockwise direction and to thus release the bell crank lever 37.

When the push bar 15 moves in a direction to the left, i.e., when this bar compels the piston 21 to perform a suction stroke, the links 30, 31 form a toggle joint and the angle enclosed between the links 30, 31 is the greatest shortly before the suction stroke of the piston 21 is completed. During such increase in the angle between the links 30, 31, the spring 28 opposes movement of the pivot pin 34, but as soon as the angle attains its maximum value, the spring 28 begins to bias the pin 34 in a direction to the left, as viewed in FIGS. 1 and 7–9. Consequently, the bell crank lever 37 is pressed against the locking member 40 and the projection 16 of the push bar 15 is pressed strongly against the stop pin 17.

In inspection of FIGS. 8 and 9 will show that the links 30 and 35 will be aligned with each other (i.e., the pivot pins 32, 34, 36 will be located in a common plane) shortly before the piston 21 completes a suction stroke.

It is evident that the improved washer pump may be modified by replacing the electromagnet 50 with a different starter device which disengages the lever 37 from the locking member 40 in response to starting of the wiper motor 6 and which thereupon maintains the pump in operation for a desired period of time. Also, it is equally possible to connect the electromagnet 50 in circuit with the motor 6 so that the motor is started automatically in response to closing of the switch 50b and remains in operation for a selected period of time after the pump is arrested. In other words, the motor 6 may begin to operate simultaneously with but is idled following the inactivation of the pump to make sure that the wipers will wipe off the liquid solvent which was sprayed in response to the last working stroke of the piston 21.

Furthermore, it is equally possible to omit the gap 87 and to operate the pump automatically in response to starting of the motor 6, i.e., the pump may operate whenever and as long as the motor is in operation.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a pump, particularly in a washer pump for spraying a liquid solvent onto the windshield of a automotive vehicle, in combination, cylinder means defining a working chamber; piston means in said chamber, one of said means being movable with reference to the other means to perform alternating working and suction strokes; energy storing means arranged to store energy when said one means moves in a first direction to perform a suction stroke, and to thereupon release such energy to effect movement of said one means in the opposite direction so that said one means performs a working stroke; drive means comprising a reciprocable motion transmitting member operative to move said one means in said first direction; and means for disengaging said drive means from said one means on completion of each suction stroke so that the speed at which said one means moves in the opposite direction is determined solely by the rate at which said energy storing means releases energy, said disengaging means comprising an actuating member coupled to said one means, a deformable toggle joint including a first and a second link, said first and second links having first ends pivotally connected to each other and second ends respectively pivoted to said motion transmitting member and said actuating member, releasable locking means for holding said toggle joint against deformation by said energy storing means while said motion transmitting means moves said one means in said first direction through the intermediary of said actuating member, and releasing means operatively connected with said motion transmitting member for temporarily releasing said locking means in such position of said motion transmitting member in which the latter has moved said one means sufficiently to complete a suction stroke whereby said toggle joint is deformed by said energy storing means while said one means performs a working stroke.

2. In a pump, particularly in a washer pump for spraying a liquid solvent onto the windshield of an automotive vehicle, in combination, cylinder means defining a working chamber; piston means in said chamber, one of said means being movable with reference to the other means to perform alternating working and suction strokes; energy storing means arranged to store energy when said one means moves in a first direction to perform a suction stroke, and to thereupon release such energy to effect movement of said one means in the opposite direction so that said one means performs a working stroke; drive means comprising a reciprocable motion transmitting member operative to move said one means in said first direction; and means for disengaging said drive means from said one means on completion of each suction stroke so that the speed at which said one means moves in the opposite direction is determined solely by the rate at which said energy storing means releases energy, said disengaging means comprising an actuating member coupled to said one means, a deformable toggle joint including a first and a second link, said first and second links having first ends pivotally connected to each other and second ends respectively pivoted to said motion transmitting member and said actuating member, releasable locking means for holding said toggle joint against deformation by said energy storing means while said motion transmitting member moves said one means in said first direction through the intermediary of said actuating member, said locking means comprising a locking member having a locking portion, a lever having a first arm normally engaging said locking portion and a second arm, and a third link having one end pivotally connected with the first ends of said first and second links and another end pivoted to said second arm, and releasing means operatively connected with said motion transmitting member for temporarily releasing said locking means by disengaging said first arm from said locking portion in such position of said motion transmitting member in which the latter has moved said one means sufficiently to complete a suction stroke whereby said toggle joint is deformed by said energy storing means while said one means performs a working stroke.

3. A structure as set forth in claim 2, wherein the angle enclosed by said second arm and said third link is an obtuse angle when said one means has completed a suction stroke.

4. A structure as set forth in claim 2, wherein said third link is aligned with said second link shortly before said one means completes a suction stroke.

5. In a pump, particularly in a washer pump for spraying a liquid solvent onto the windshield of an automotive vehicle, in combination, cylinder means defining a working chamber; piston means in said chamber, one of said means being movable with reference to the other means to perform alternating working and suction strokes; energy storing means arranged to store energy when said one means moves in a first direction to perform a suction stroke, and to thereupon release such energy to effect movement of said one means in the opposite direction so that said one means performs a working stroke; drive means comprising a reciprocable motion transmitting member operative to move said one means in said first direction; and means for disengaging said drive means from said one means on completion of each suction stroke so that the speed at which said one means moves in the opposite direction is determined solely by the rate at which said energy storing means releases energy, said disengaging means comprising an actuating member coupled to said one means, a deformable toggle joint including a first and a second link, said first and second links having first ends pivotally connected to each other and second ends respectively pivoted to said motion transmitting member and said actuating member, releasable locking means for holding said toggle joint against deformation by said energy storing means while said motion transmitting member moves said one means in said first direction through the intermediary of said actuating member, said locking means comprising a locking member having a locking portion, a lever having a first arm normally engaging said locking portion and a second arm, resilient means for biasing said locking portion in engagement with said first arm, and a third link having one end pivotally connected with the first ends of said first and second links and another end pivoted to said second arm, and releasing means operatively connected with said motion transmitting member for temporarily releasing said locking means by disengaging said first arm from said locking portion against the bias of said resilient means in such position of said motion transmitting member in which the latter has moved said one means sufficiently to complete a suction stroke whereby said toggle joint is deformed by said energy storing means while said one means performs a working stroke.

6. A structure as set forth in claim 5, further comprising starter means of disengaging said second arm from said locking portion independently of said releasing means.

7. A structure as set forth in claim 6, wherein said locking member comprises a second portion and fulcrum means located intermediate said portions, said starter means comprising an electromagnet energizable to attract said second portion and to thus disengage said locking portion from said first arm, and normally open electric switch means connected in circuit with said electromagnet and arranged to complete said circuit when the operator desires to release said locking means.

References Cited by the Examiner

UNITED STATES PATENTS

| | | | |
|---|---|---|---|
| 1,892,631 | 12/1932 | Quigg | 103—23 |
| 2,274,293 | 2/1942 | Horton | 230—14 |
| 2,389,475 | 11/1945 | Watson | 103—23 X |
| 2,878,505 | 3/1959 | Ziegler | 103—23 X |
| 3,115,095 | 12/1963 | Ziegler | 103—23 |

FOREIGN PATENTS 319,770  7/1919  Germany.

MARK M. NEWMAN, *Primary Examiner.*

SAMUEL LEVINE, *Examiner.*

W. L. FREEH, *Assistant Examiner.*